(No Model.)
W. M. BROWN.
JOINT FOR ELECTRIC CABLES.
No. 595,367. Patented Dec. 14, 1897.
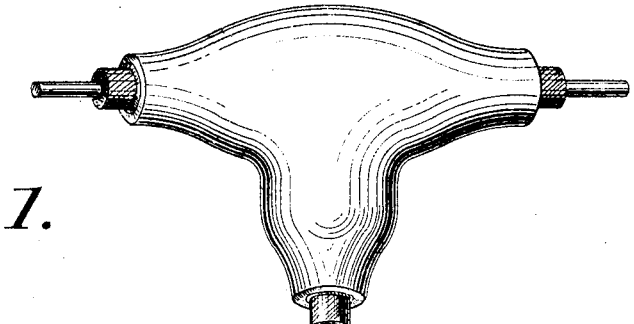
Fig. 1.
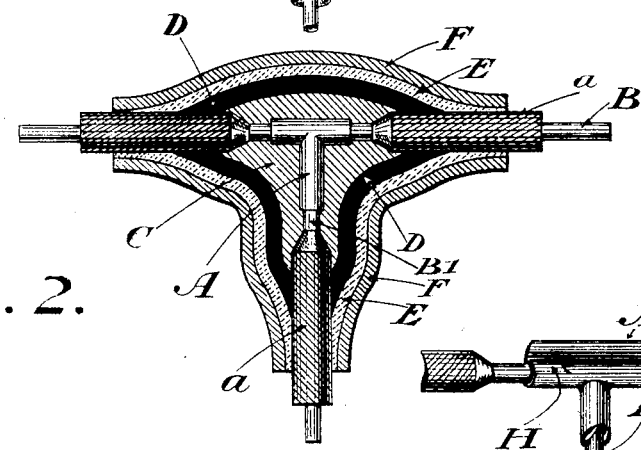
Fig. 2.
Fig. 4.
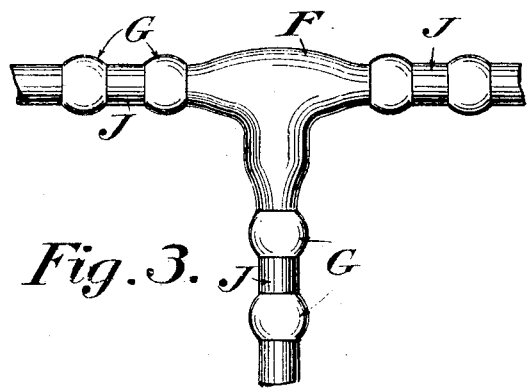
Fig. 3.
WITNESSES:
INVENTOR
W. Milt Brown
BY Richard Eyre
ATTORNEY.
THE NORRIS PETERS CO., PHOTO-LITHO., WASHINGTON, D. C.

UNITED STATES PATENT OFFICE.

WILLIAM MILTON BROWN, OF JOHNSTOWN, PENNSYLVANIA.

JOINT FOR ELECTRIC CABLES.

SPECIFICATION forming part of Letters Patent No. 595,367, dated December 14, 1897.

Application filed August 10, 1897. Serial No. 647,669. (No model.)

*To all whom it may concern:*

Be it known that I, WILLIAM MILTON BROWN, of Johnstown, Cambria county, Pennsylvania, have invented certain new and useful Improvements in Joints for Electric Cables, of which the following is a specification.

My invention relates to the laying of underground electric cables, and more particularly to improved means for connecting a branch metal-covered cable to a main cable of the same type.

The object of my invention is to provide a T between two such cables of such character that all parts will be thoroughly protected and yet necessitating very few wiped joints.

My invention consists in preparing such a branch connection as I have mentioned as a finished article of manufacture in the shop or factory, so that when laying the cable it will only be necessary to connect the ends of the built-up T to the main cables by the usual sleeve-couplings.

Broadly outlined, my invention consists in a central T-shaped member through which passes a short section of cable and into which is passed another short piece of cable. These are both secured to the central member by pouring solder therein, and the whole is then surrounded by rubber or asbestos insulation. A mold is then placed about the structure and a suitable lead covering is cast about it.

Referring now to the drawings, Figure 1 shows a finished T with the ends of the cables prepared for being coupled to the main cable. Fig. 2 is a cross-section of the same. Fig. 3 shows the T of Fig. 1 secured by sleeve-couplings to the main cables. Fig. 4 shows a stage in the manufacture of the T.

A is preferably a small T of sheet-copper, which, as shown in Fig. 4, is cut open, so that the piece of cable B can be laid through it. The lower end of A receives the end of the branch cable B'.

H represents the solder securing A, B, and B' together.

C is preferably unvulcanized Para rubber, which is secured about A B B' and the pointed ends of the insulation a' of the cables by a rubber cement of any suitable character.

About the rubber C is wound any suitable insulating-tape D such as is used in the art for this and kindred purposes.

E represents asbestos, which is preferably secured about the tape by cement. A suitable mold is now placed about the structure and the whole completely covered with a metal F, such as lead.

In Fig. 3, G G represent the wiped joints at each end of the sleeve-couplings J J between the T and the main cables. As these are well known to the art I do not further describe them.

In the practice of laying underground lead cables, particularly where many branches are required, the difficulty of making the connections at the branches has been great. By the use of my invention I am enabled to have the advantage of working in a shop instead of in the open street, thus being able to work with greater system, accuracy, and economy.

It is evident that I provide a highly-efficient joint in which the danger of leaks is reduced to a minimum and all parts of the connections are thoroughly protected by the metal covering.

It is of course clear that I am not limited to the exact details of construction and arrangement herein shown, for many modifications will readily suggest themselves to those skilled in the art.

Having thus described my invention, what I claim, and desire to protect by Letters Patent, is—

1. A T for electric cables comprising, in combination, a central member surrounding and secured about naked portions of the cables, insulating material surrounding the said central member and naked portions and a metal covering surrounding said insulators.

2. A T for electric cables comprising a metallic T-core uniting the naked ends of the cables, in combination with insulating material and a cover of soft metal for protecting the core and said naked ends.

3. As a new article of manufacture, a soft-metal T inclosing short sections of conductors and insulating material between said conductors and the metal shell the naked ends of each of said conductors extending beyond the edges of the metal shell.

In testimony whereof I have affixed my signature in presence of two witnesses.

W. MILTON BROWN.

Witnesses:
RICHARD EYRE,
H. W. SMITH.